UNITED STATES PATENT OFFICE.

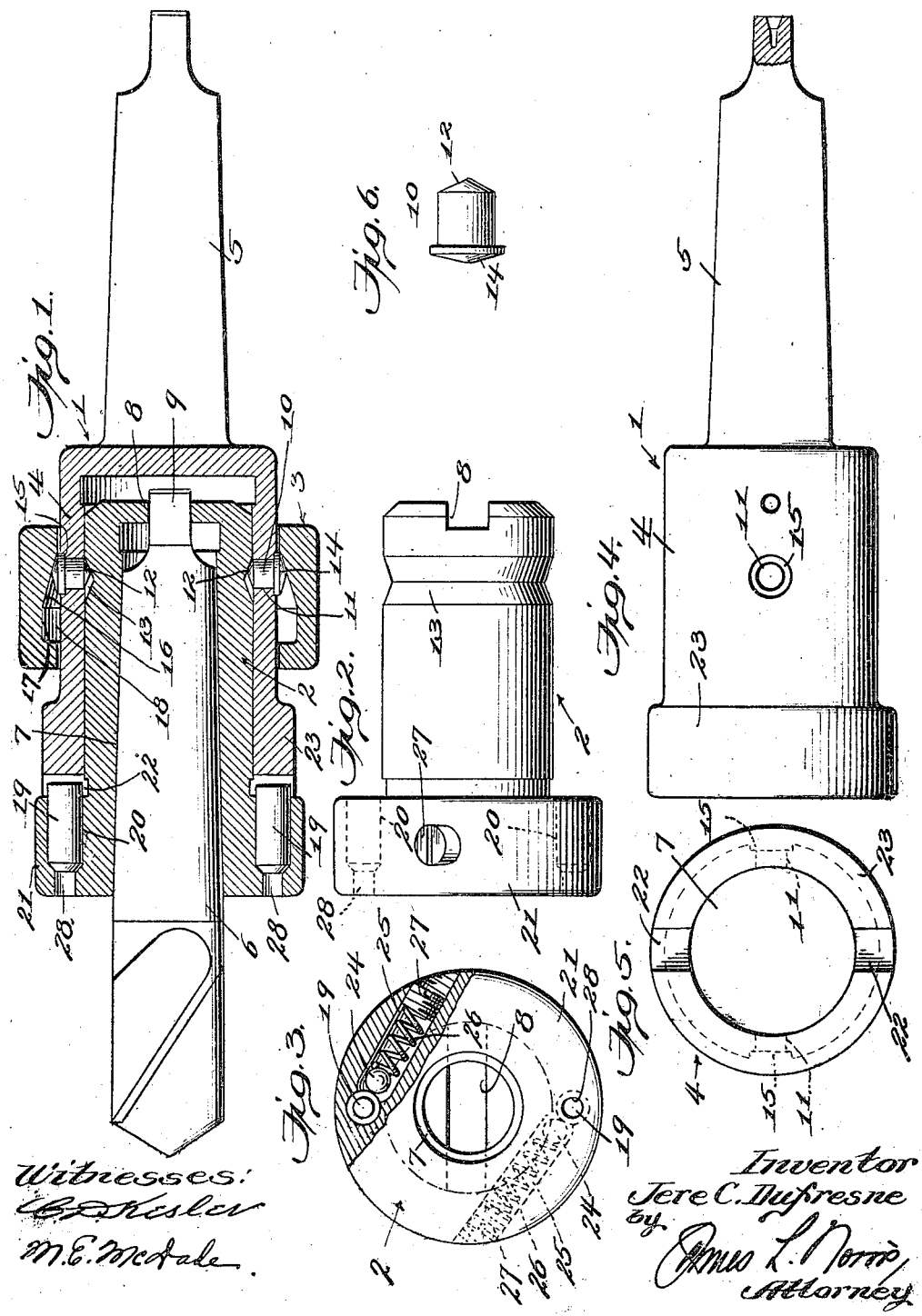

JERE C. DUFRESNE, OF RAHWAY, NEW JERSEY.

CHUCK.

1,252,253.　　　　　Specification of Letters Patent.　　Patented Jan. 1, 1918.

Application filed November 21, 1916. Serial No. 132,636.

*To all whom it may concern:*

Be it known that I, JERE C. DUFRESNE, a citizen of the United States, residing at Rahway, in the county of Union and State of New Jersey, have invented new and useful Improvements in Chucks, of which the following is a specification.

The present invention relates to chucks, and more particularly to that type of chuck in which a safety connection is employed between the cutting tool and the chuck body, this connection being designed to yield in one way or another when subjected to a predetermined force, with the result that the tool is uncoupled from its driving mechanism, and neither the one nor the other is injured thereby.

The invention comprehends certain improvements, hereinafter described at length, whereby the safety connection is caused to be sheared or broken off on being subjected to excessive strain, thus permitting the drill spindle to continue its motion idly, and without transmitting the same to the tool; and to this end, the invention resides both in the particular mounting and arrangement of the connecting elements themselves in their carrier, and in the construction of the part with which they coöperate, and by which the shearing action is effected.

The invention also comprehends certain further improvements in or relating to the mounting of the tool proper, such improvements having for their object the removal and insertion of the cutting tool while the spindle is in motion.

An embodiment of the invention is illustrated in the accompanying drawing, whereof:

Figure 1 is a part-sectional side elevation of the implement complete;

Fig. 2 is a side elevation of the collet comprised in the implement;

Fig. 3 is a part-sectional end elevation of Fig. 2;

Fig. 4 is a side elevation of the chuck body and its stem or spindle;

Fig. 5 is an end elevation of Fig. 4; and

Fig. 6 is a side elevation of one of the coupling pins.

As shown in said drawing, the chuck consists, as a whole, of the following main parts or elements, all constructed of hardened steel, to wit: the chuck body 1, the collet 2 and the coupling collar 3, the chuck body comprising, in turn, a tubular, or substantially tubular, socket 4, and a stem, shank or spindle 5, the latter designed for connection to a driving means of some character.

The collet 2 receives therein the shank of the drill or other cutting tool 6, and is formed for that purpose with a longitudinal recess or bore 7, which has a slight taper from the open outer end of the collet to the closed inner end thereof, and which, as will be understood, conforms to the cross-sectional shape of the tool shank, the end wall of the collet being provided with a central aperture 8 for the projection of the tang 9 therethrough.

The collet, which is substantially cylindrical in appearance, is designed to fit within the socket 4, and is held in place therein by the sliding collar 3, through the intermediary of a plurality of hardened steel coupling pins 10, one of which is represented in detail in Fig. 6. These pins have a sliding fit in radial openings 11, pierced through the wall of the socket, and are of sufficient length to permit their pointed or beveled inner ends 12 to project into an annular groove 13, formed in the outer circumference of the collet, when the pins are in active position, the enlarged convexed heads 14 of the pins being received in the enlarged outer portions 15 of said openings and projecting outward beyond the same. The movements of the pins through their respective openings are controlled by means of the collar 3, which, when slid toward the front end of the socket, exerts a wedging action upon the pins, which forces their inner ends against the adjacent inclined wall of the groove 13, the latter being V-shaped in cross-section, as shown. To produce this action, the inner face of the collar is cut away centrally, so as to form a continuous inclined, or cam portion 16, which merges at its front end into a plane portion 17, the latter portion being spaced from the uncut part of the aforesaid inner face, and thus providing an annular deepened portion or pocket 18, into which the pin heads project when withdrawn from the groove to disconnect or uncouple the collet.

The connection between the chuck body and the collet, which transmits the rotary movement of the former to the latter and, hence, to the cutting tool, is effected by the safety device above referred to, which device, as previously stated, is of such a character as to yield when an excessive strain or force is exerted thereon. In the present construction, which for all practical purposes may be regarded as preferred, this device consists of a series of cylindrical pins 19, fitting in longitudinal pockets 20, formed in the enlarged outer or front end portion 21 of the collet, the external diameter of this portion 21 being slightly greater than that of the socket 4. The pockets 20 are of less length than the pins, so that the rear ends of the latter project beyond said pockets and are received in seats 22, formed in the enlarged front end 23 of the socket 4 and opening through the inner and outer faces thereof, as shown in Fig. 5. The pins are constructed of soft steel, and for this reason their projecting ends will be sheared or broken off by the torsion imposed upon them by the walls of the seats 22 in the hardened steel socket or chuck body, this severing or shearing off of the pin ends serving to uncouple the tool from the spindle, since the pins 10 merely act to hold the collet in place in the chuck socket and do not lock the parts together, owing to the extension of their pointed ends 12 into the groove 13. Hence, when the above-mentioned breakage of the pins occurs, the drill spindle will continue its rotation idly, and will no longer occasion the rotation of the tool.

The safety connecting pins 19 are acted upon by yielding pressure devices, which serve to prevent displacement thereof, such devices being here shown as comprising balls 24, or the like, arranged within tangential passages 25 formed in the enlarged portion 21 of the collet, the inner ends opening through the side wall of said enlargement. These balls are pressed against the pins by springs 26 that are likewise disposed within said passages, the outer ends of the springs bearing against screw-plugs 27 which close the corresponding ends of the passages; see Fig. 3. The pockets 20 extend entirely through the enlargement 21, but their front or outer portions are constricted, as shown at 28, Fig. 1, thereby limiting the inward movement of the pins, as will be understood, and at the same time, providing narrow openings or apertures through which an instrument can readily be inserted to dislodge the pins, in the event of the latter having become jammed in their pockets during breakage.

So much of the invention as relates to the safety connecting pins 19, their mounting, and the manner in which their projecting rear ends are sheared or broken off, is believed to be clear from the description *supra*, and, hence, to require no further explanation. So far as the collar 3 and the collet-retaining pins 10 are concerned, it is apparent that when the collar is in its initial or retracted position upon the chuck body, the heads 14 of said pins will be opposite the pocket 18 in said collar, and out of contact with the inclined wall 16; but when the collar is moved forward, or toward the enlargement 23 on the chuck body, the said wall 16 will ride across the pin heads and will forcibly cam the same inward through the openings 11, thus holding the collet against outward movement and consequent displacement. Conversely, if for any reason it is desired to remove the collet and tool, either while the drill spindle is in motion, or while it is stationary, this can readily be effected simply by forcing the collar backward along the chuck body, with the result that the pocket 18 is again brought opposite the pins. The collet can then be loosened and removed from the chuck body by hand, or, if stuck, by inserting an instrument in the seats 22 and pressing outwardly against the pins 19, the inclined rear wall of the groove 13 camming the pins 10 outwardly through their openings into the pocket 18 as the collet is withdrawn. The inclined or cam wall 16, in practice, overcomes any slight inaccuracies in the manufacture of the pins 10, owing to its mode of operation, since the collar has ample movement to compensate for heads of different heights and different degrees of angular convexity, the beveling of the walls of the groove 13 acting in the same way, with respect to the inner ends 12 of said pins, but to a less extent.

I claim as my invention:

1. A chuck, comprising, in combination, a socket; a collet removably fitted in said socket and provided with an axial bore to receive the tool shank; said collet and socket having circumferentially-enlarged confronting ends which are formed with a plurality of alining recesses, the recesses in the socket opening through the outer faces thereof; and a plurality of soft metal pins seated in the recesses in the collet and projecting into the recesses in the socket to transmit the normal rotary movement of said socket to said collet, but adapted to break when subjected to a torsional strain of predetermined degree so as to uncouple the tool from the socket; said pins terminating short of the bottoms of the socket recesses to enable the insertion of an instrument into the latter to loosen the collet.

2. A chuck, comprising, in combination, a socket having a circumferentially-enlarged outer end provided with a plurality of seats, a collet removably fitted in said socket and provided with an axial bore to receive the tool shank and with a circumferentially-enlarged outer end which faces the socket enlargement and is formed with a plurality of longitudinal pockets extending entirely therethrough and alining with said seats;

and a plurality of soft metal pins fitted in said pockets and projecting into said seats to transmit the normal rotary movement of said socket to said collet, but adapted to break when subjected to a torsional strain of predetermined degree so as to uncouple the tool from the socket; said pockets having their outer ends constricted to limit the inward movement of the pins and to enable the insertion of an instrument therethrough to dislodge said pins when jammed during breakage.

3. A chuck, comprising, in combination, a socket having a circumferentially-enlarged front end provided with a plurality of seats which open through the outer faces thereof; a collet removably fitted in said socket and provided with an axial bore to receive the tool shank and with a circumferentially-enlarged outer end which faces the socket enlargement and is formed with a plurality of longitudinal pockets extending entirely therethrough and alining with said seats; and a plurality of soft metal pins fitted in said pockets and projecting into said seats to transmit the normal rotary movement of said socket to said collet, but adapted to break when subjected to a torsional strain of predetermined degree so as to uncouple the tool from the socket; said pins terminating short of the bottoms of said seats to enable the insertion of an instrument into the latter to loosen the collet, and said sockets having their outer ends constricted to limit the inward movement of the pins and to enable the insertion of an instrument therethrough to dislodge said pins when jammed during breakage.

4. A chuck, comprising, in combination, a socket; a collet removably fitted in said socket and provided with an axial bore to receive the tool shank; said collet having a circumferentially-enlarged outer end which confronts the outer end of said socket and is formed with a plurality of recesses opening through its rear face and with a plurality of passages whose inner ends open into said recesses and whose outer ends open through the side wall of the enlargement; a plurality of soft metal pins fitted in said recesses and engaged with the confronting end of said socket to transmit the normal rotary movement of the latter to the collet, but adapted to break when subjected to a torsional strain of predetermined degree so as to uncouple the tool from the socket; a plurality of pressure devices arranged in said passages and bearing against said pins to hold the same against displacement; a plurality of closure members fitted in the outer ends of said passages; and a plurality of springs arranged in said passages and bearing at opposite ends against the corresponding pressure devices and closure members.

In testimony whereof I have hereunto set my hand in presence of two subscribing witnesses.

JERE C. DUFRESNE.

Witnesses:
WILLIAM J. ADAM,
WILLIAM E. LAWSON.